(12) United States Patent
Cox

(10) Patent No.: US 11,927,529 B2
(45) Date of Patent: *Mar. 12, 2024

(54) GAS DETECTION SYSTEM AND METHOD

(71) Applicant: CSIR, Johannesburg (ZA)

(72) Inventor: Ettienne Cox, Johannesburg (ZA)

(73) Assignee: CSIR, Johannesburg (ZA)

(*) Notice: Subject to any disclaimer, the term of this patent is extended or adjusted under 35 U.S.C. 154(b) by 0 days.

This patent is subject to a terminal disclaimer.

(21) Appl. No.: 18/112,364

(22) Filed: Feb. 21, 2023

(65) Prior Publication Data

US 2023/0194420 A1 Jun. 22, 2023

Related U.S. Application Data

(63) Continuation of application No. 16/754,683, filed as application No. PCT/IB2018/057808 on Oct. 9, 2018, now Pat. No. 11,585,751.

(51) Int. Cl.
| | |
|---|---|
| *G01N 21/3504* | (2014.01) |
| *G01M 3/38* | (2006.01) |
| *G01N 3/38* | (2006.01) |
| *G01N 21/17* | (2006.01) |

(52) U.S. Cl.
CPC .......... *G01N 21/3504* (2013.01); *G01M 3/38* (2013.01); *G01N 2021/1772* (2013.01);
(Continued)

(58) Field of Classification Search
CPC ....... G01N 21/3504; G01N 2021/1772; G01N 2201/0221; G01N 2201/0612; G01N 2201/068; G01M 3/38

See application file for complete search history.

(56) References Cited

U.S. PATENT DOCUMENTS

| | | |
|---|---|---|
| 6,157,033 A | 12/2000 | Chudnovsky |
| 2008/0231719 A1 | 9/2008 | Benson et al. |

(Continued)

OTHER PUBLICATIONS

"Development of a pulsed backscatter-absorption gas-imaging system and its application to the visualization of natural gas leaks", Applied Optics, vol. 37, No. 18, Jun. 20, 1998, by Kulp et al. (Year: 1998).*

(Continued)

*Primary Examiner* — Jamil Ahmed
(74) *Attorney, Agent, or Firm* — Hickman Becker Bingham Ledesma LLP

(57) ABSTRACT

This invention relates to a method of and system for facilitating detection of a particular predetermined gas in a scene under observation. The gas in the scene is typically associated with a gas leak in equipment. To this end, the system comprises an infrared camera arrangement; a strobing illuminator device having a strobing frequency matched to a frame rate of the camera; and a processing arrangement. The processing arrangement is configured to store a prior frame obtained via the infrared camera arrangement; and compare a current frame with the stored prior frame and generate an output signal in response to said comparison. The system also comprises a display device configured to display an output image based at least on the output signal generated by the processing arrangement so as to facilitate detection of the particular predetermined gas, in use.

20 Claims, 4 Drawing Sheets

(52) U.S. Cl.
CPC ............... *G01N 2201/0221* (2013.01); *G01N 2201/0612* (2013.01); *G01N 2201/068* (2013.01)

(56) References Cited

U.S. PATENT DOCUMENTS

| | | |
|---|---|---|
| 2011/0038507 A1 | 2/2011 | Hager |
| 2012/0314080 A1 | 12/2012 | Lee et al. |
| 2015/0369730 A1 | 12/2015 | Schmidt et al. |

OTHER PUBLICATIONS

Mcrae T G et al., "Backscatter Absorption Gas Imaging: A New Technique for Gas Visualization", Applied Optics Optical Society of America, vol. 32, No. 21, dated Jul. 20, 1993, pp. 4040-4041.
Kulp T J et al., "Development of a Pulsed Backscatter-Absorption Gas-Imaging System and its Application to the Visualization of Natural Gas Leaks", Optical Society of America, dated Jun. 20, 1998.
European Patent Office, "Search Report" in application No. PCT/IB2018/057808, dated Apr. 12, 2018, 5 pages.
Current Claims in application No. PCT/IB2018/057808, dated Apr. 2018, 7 pages.
Cox, U.S. Appl. No. 16/754,683, filed Apr. 8, 2020, Notice of Allowance and Fees Due, dated Oct. 17, 2022.
Cox, U.S. Appl. No. 16/754,683, filed Apr. 8, 2020, Non-Final Rejection, dated Jun. 20, 2022.

\* cited by examiner

GAS DETECTION SYSTEM AND METHOD

CROSS-REFERENCE TO RELATED APPLICATIONS; BENEFIT CLAIM

This application claims the benefit as a Continuation of application Ser. No. 16/754,683, filed Apr. 8, 2020, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF INVENTION

THIS INVENTION relates to gas detection systems and methods of gas detection, particularly gas leakage detection systems and methods of detecting gas leakage from equipment.

BACKGROUND TO THE INVENTION

In various industries, undesirable gas leaks from equipment, for example, equipment in power distribution systems, are undesirable for various reasons, for example, safety, environmental, operational requirements, and the like. In view of environmental reasons, environmental legislation in countries worldwide impose stricter stances on spillages and pollution of hazardous and greenhouse gases. It is thus desirable to be able to detect a gas leak and pinpoint exactly the location of the gas leaks so that suitable repair protocols are deployed to address the leak. For example, in the case of $SF_6$ that is used in electrical installation, a loss of gas not only causes environmental harm but also may lead to malfunctioning of the installation. A problem in detecting leaks is encountered when gas leaks (e.g., colourless gas) are against ambient backgrounds as they are imperceptible to the human eye. These leaks often go unnoticed with undesirable outcomes.

One way of detecting such gas leaks quickly, particularly at long stand-off distances, in varying ambient backgrounds, for example, in such as electrical, chemical, and petrochemical industries, is an Optical Gas Imaging (OGI) technique. The OGI technique makes use of a gas detection camera operating at a selected wavelength so as to visualise any gas leaks. In this way, gas leaks may be easily detected and the necessary steps be taken to repair equipment associated with such leaks.

Some gas detection cameras currently in the market have means of detecting gas leaks by way of so called 'passive' gas detection technology. This technology employed a cooled detector and a cooled bandpass filter in order for the camera to detect said leaks.

Other cameras such as those of the type descried in U.S. Pat. No. 5,001,345 use infrared laser-illuminated imaging for the visualization of gas plumes. In this prior art document, a laser that is constantly ON is employed to supply photons to an item (e.g., a pipe) under test being supplied with a preheated test gas such as $SF_6$. Images from narrow and wideband filters are then compared in order to detect gas leaks.

Some cameras such as those of the type described in US2015/0369730 make use of active illumination and passive gas detection technologies so as to be able to visualize and detect gas leaks. However, the Applicant has noted difficulty in detecting gas leaks in these systems when the background radiated photons and the photon traveling through the gas cloud is very similar. Moreover, these so-called conventional active/passive systems are very slow from a processing perspective and require that the camera be kept very still as movement thereof will impact on accuracy of the detection.

In this regard, it is thus an object of the present invention to address these need/s and/or to be able to better detect gas leaks and/or detect gas leaks in a different manner.

SUMMARY OF THE INVENTION

According to a first aspect of the invention, there is provided a system for detecting or facilitating detection of a predetermined gas in a scene under observation, wherein the system comprises:
an infrared camera arrangement configured to acquire infrared images of the scene under observation at a predetermined frame rate;
an illuminator device configured to radiate photons at a predetermined wavelength to the scene under observation, wherein the illuminator device is strobed at a predetermined strobing frequency between an ON state in which photons at the predetermined wavelength are radiated to the scene under observation, and an OFF state in which photons of the predetermined wavelength are not radiated to the scene under observation, and wherein the strobing frequency of the illuminator device is associated with the predetermined frame rate of the infrared camera arrangement such that active infrared images are acquired by the infrared camera arrangement during the ON state of the illuminator device and passive infrared images are acquired by the infrared camera arrangement during the OFF state of the illuminator device in an alternating fashion at the predetermined frame rate;
a processing arrangement, wherein the processing arrangement comprises:
data storage device configured to store at least one prior infrared image acquired by the infrared camera arrangement, wherein the prior infrared image is either an active infrared image or a passive infrared image; and
at least one processor configured to compare at least one current infrared image acquired by the infrared camera arrangement with the at least one prior infrared image stored in the data storage device and generate an output signal in response to said comparison, wherein the current infrared image is either a passive infrared image or an active infrared image;
; and
a display device configured to display an output image based at least on the output signal generated by the processing arrangement so as to facilitate detection of the particular predetermined gas, in use.

The system may be configured to strobe the illuminator device in a temporal fashion between the ON state and the OFF state.

It will be understood that the one or more processors may be configured to compare active and passive infrared images.

One or both of the predetermined strobing frequency and the predetermined frame rate may be selected so that the infrared camera arrangement may acquire at least one active image during every ON state of the illuminator device, and at least one passive image during every OFF state of the illuminator device.

The predetermined frame rate of the camera arrangement may be a multiple of the predetermined strobing frequency of the illuminator device. In this way, the camera arrangement may acquire multiple active and passive infrared images in each strobing cycle of the strobing frequency. Each strobing cycle may be understood to mean each time the illuminator device is operated ON and OFF.

It will be noted that the provision that "the strobing frequency of the illuminator device is associated with the predetermined frame rate of the infrared camera arrangement" may be understood to mean that the strobing frequency of the illuminator device is related to the predetermined frame rate of the infrared camera arrangement. In this way, the acquiring of infrared images during the strobing of the illuminator device is effectively calibrated thus improving the sensitivity of the system as described herein.

In one example embodiment, the predetermined frame rate of the infrared camera arrangement may be an even multiple of the strobing frequency. In this way, as alluded to above, the same number of active infrared images are compared with the same number of passive infrared images are acquired in a particular cycle of the of strobing of the illuminator device. For example, the predetermined frame rate may be at least twice or four times that of the predetermined strobing frequency. In this way, the infrared camera arrangement may acquire one or two active infrared images during the ON state of the illuminator device. Similarly, the camera arrangement may acquire one or two passive infrared image during the OFF state of the illuminator device in an alternating fashion, continuously during operation of the system. Thus, the processor arrangement may be configured to compare the same number of active and passive images in one strobing cycle. It will be noted that the processor arrangement may be configured to compare active and passive infrared image/s in each strobing cycle of the illuminator device.

The illuminator device and the infrared camera arrangement may be synchronized so that active images are acquired in the ON state of the illuminator device and passive images are acquired in the OFF state of the illuminator device in an alternating continuous fashion. In this way, the processor arrangement effectively is certain to capture the desired active and passive infrared images during a particular strobing cycle.

Though it is mentioned that the processor arrangement is configured to compare at least one active and passive infrared image, it will be understood that the processor arrangement may be configured to compare more than one active and passive infrared images.

The system may comprise a shutter which is any one of an electronic shutter, a mechanical shutter, and an electromechanical shutter configured to strobe the illuminator device.

The processor arrangement may be configured to compare the at least one current frame and the at least one prior frame by determining the difference/s between the at least one current frame and the at least one prior frame, wherein output signal corresponds to an infrared image representative of the difference/s between the at least one current infrared image and the at least one prior infrared image.

The processor may be configured to compare the at least one current infrared image or frame and the at least one prior infrared image or frame by subtracting the same from each other. The output signal may thus be representative of the differences between the current frame and the prior frame. It will be understood that in some example embodiments, the processor may make use of other techniques, for example, other conventional image processing techniques to compare frames.

The infrared camera arrangement may comprise a single narrow bandwidth filter centered substantially at, or around, a gas absorption wavelength of the particular predetermined gas selected for detection.

The infrared camera arrangement may be an infrared video camera arrangement configured to acquire infrared video images. These images may be acquired in a continuous fashion.

The infrared camera arrangement may comprise:
  a detector comprising an array of quantum-well infrared photo detectors configured to generate an electrical signal in response to a photon being received thereby;
  a lens having a field of view, wherein the lens is configured to collect photons from a scene under observation and project the photons onto the detector; and
  a cooling engine configured to control the temperature of the detector, and the optical filter to be at, or around, predetermined temperatures, respectively;
  wherein the infrared camera arrangement is configured to generate infrared images of the scene under observation based on electrical signals generated by the detector.

The predetermined wavelength of the photons radiated by the illuminator device may be at, or around, a gas absorption wavelength of the particular predetermined gas selected for detection.

The detector, and lens may be selected based on a gas absorption wavelength of the particular predetermined gas selected for detection.

The detector may comprise a two dimensional array of quantum-well infrared photo detectors. The quantum-well infrared photo detectors may have an operative surface and are configured to generate electrical signals in the form of photocurrent in response to an irradiance on the operative surface thereof. The quantum-well infrared photo detectors may have a quantum efficiency based on the particular selected gas for detection.

The infrared camera arrangement may be configured to convert photocurrent from the detector to digital signals representative of infrared images of the scene under observation.

The quantum-well infrared photo detectors may comprise layers of Gallium Arsenide, and Aluminium Gallium Arsenide. The lens may be constructed of Germanium, or a combination of Germanium and Silicon.

The aforementioned filter may be integrated with the detector.

The cooling engine may be configured to cool the detector to and maintain the detector at a temperature between a range of 60K and 75K. The cooling engine may be configured to cool the optical filter to and maintain the optical filter at a temperature between a range of 85K and 95K.

The cooling engine may be configured to maintain the detector at approximately 62K or 70K. The cooling engine may be configured to maintain the optical filter at approximately 90K.

The system may comprise a visible light camera arrangement configured to acquire visible light images of the scene under observation. The infrared camera arrangement and the visible light camera arrangement may have substantially the same or similar field of view.

The visible light camera arrangement may be a visible light video camera arrangement configured to acquire visible light video images.

The processing arrangement may be configured to combine the output signal generated thereby with an output from the visible light camera arrangement to generate a combined signal representative of an infrared image of the scene under observation superimposed onto a visible image of the scene under observation. The combined signal may correspond to the output image displayed by the display device.

The processing arrangement may be configured to:
receive an electrical signal from the detector;
generate an infrared image based on the electrical signal received from the detector; and
clean the generated infrared image by one or more of removing, replacing, and correcting pixels of the generated image which do not meet predetermined characteristics so as to generate a cleaned infrared image.

The illuminator device may be selected from a group comprising an infrared illuminator, and a laser. The infrared illuminator may be in the form of a heated electrical filament arrangement, and wherein the laser is in the form of a quantum cascade laser. The predetermined wavelength at which the illuminator device radiates photons may be based on the predetermined gas to be detected.

The system may be provided in a housing. The housing may define a thermally insulated compartment for enclosing all or a majority of the components of the infrared camera arrangement. The system may comprise a suitable cooling arrangement to cool at least components located in the housing.

The system may comprise a user interaction module comprising suitable actuators located on one or more outer surfaces of the housing, wherein operation of the actuators generate suitable command signals for controlling the system.

The display device may be provided within the housing, and wherein the housing comprises an eyepiece aligned with the display device so that users may view the display device within the housing via the eye-piece. As described herein the eye-piece may be a dual eye-piece to allow a user to view the display device with both eyes, in use. As will be described below, the display device may be in the form of a liquid crystal display (LCD), light emitting diode (LED) display, organic LED (OLED) display, or the like.

The system may comprise a re-chargeable power supply unit configured to power the electrical or electronic components of the system.

The system may comprise a laser pointer to assist a user to orient the system to the scene under observation.

The frame rate of the infrared camera arrangement may be between 15 Hz and 60 Hz. The illuminator device may be strobed at a matching frequency (strobing frequency) of between 15 Hz and 60 Hz. However, it will be noted that the illuminator device may be strobed at other strobing frequencies depending on the particular example embodiment in question.

According to a second aspect of the invention, there is provided a method for detecting a particular predetermined gas in a scene under observation or for facilitating the detection of the presence of a particular predetermined gas, the method comprising:
radiating photons at a predetermined wavelength towards a scene under observation in a strobed fashion at a predetermined strobing frequency such that photons at the predetermined wavelength are radiated to the scene under observation, and photons at the predetermined wavelength are not radiated to the scene under observation in an alternating fashion according to the predetermined strobing frequency;
acquiring infrared images from the scene under observation at a predetermined frame rate, wherein the predetermined frame rate is associated with the predetermined strobing frequency such that active infrared images are acquired while photons at the predetermined wavelength are radiated to the scene under observation, and passive infrared images are acquired while photons at the predetermined wavelength are not radiated to the scene under observation in an alternating fashion at the predetermined frame rate;
storing at least one prior infrared image acquired from the scene under observation, wherein the at least one prior infrared image is either an active infrared image or a passive infrared image,
comparing at least one current infrared image acquired with the stored at least one prior infrared image, wherein the at least one prior infrared image is either a passive infrared image or an active infrared image;
generating an output signal in response to said comparison; and
displaying an output image on a display device based at least on the generated output signal so as to facilitate detection of the particular predetermined gas.

The method may comprise the step of radiating photons for a predetermined period of time towards the scene and simultaneously acquiring an active infrared image of the scene, and stopping radiating photons for a predetermined period of time towards the scene and simultaneously acquiring a passive infrared image of the scene, wherein the active and passive images are acquired at the predetermined frame rate, and the predetermined periods of time where photons are radiated or stopped is based on at the predetermined frequency of strobing.

The method may comprise radiating photons at the predetermined wavelength towards the scene for a predetermined period of time and simultaneously acquiring an active infrared image of the scene, and not radiating photons at the predetermined wavelength towards the scene for a predetermined period of time and simultaneously acquiring a passive infrared image of the scene, wherein the active and passive images are acquired at the predetermined frame rate, and the predetermined periods of time where photons are radiated towards the scene or not are based on the predetermined strobing frequency It will be appreciated that the method may comprise radiating photons by controlling an illuminator device as described above to radiate photons in a strobed fashion at the predetermined frequency.

The method may comprise comparing the at least one current frame and the at least one prior frame by determining the difference/s between the at least one current frame and the at least one prior frame, wherein output signal corresponds to an infrared image representative of the difference/s between the at least one current infrared image and the at least one prior infrared image.

The method may comprise comparing the current frame and the prior frame by subtracting the same from each other, wherein the output signal is representative of the difference between the current frame and the prior frame.

The method may comprise acquiring infrared video images.

The method may comprise:
acquiring visible light images of the scene under observation;
combining the generated output signal with a signal representative of an acquired visible light image to generate a combined signal representative of an infrared image of the scene under observation superimposed onto a visible image of the scene under observation; and displaying the combined signal on the display device.

The method may comprise acquiring visible light video images.

The method may comprise:

radiating photons at a predetermined wavelength towards the scene under observation;

collecting photons from the scene under observation with a lens having a field of view;

projecting, with the lens, photons collected to a detector;

filtering photons projected from the lens with an optical filter thereby to allow only projected photons at a predetermined wavelength to pass through to the detector;

generating electrical signals in response to filtered photons of a predetermined wavelength being received by the detector; and generating an infrared image of the scene under observation based on the electrical signals received from the detector so as to enable detection of the gas, in use.

The method may comprise controlling the temperature of the detector, and the optical filter to be at, or around, predetermined temperatures, respectively.

The predetermined wavelength associated with the steps of radiating photons, filtering photons, and generating electrical signals may be at, or around, a gas absorption wavelength of the particular predetermined gas selected for detection.

The method may comprise:

generating electrical signals in the form of photocurrent in response to an irradiance on an operative surface of the detector;

converting photocurrent to digital signals; and generating infrared images of the scene under observation based on the digital signals.

The method may comprise cooling the detector to and maintaining the detector at a temperature between a range of 60K and 75K. The method may comprise cooling the optical filter to and maintaining the optical filter at a temperature between a range of 85K and 95K.

The predetermined frame rate may be a multiple of the predetermined strobing frequency. The predetermined frame rate may be approximately twice or four times the predetermined strobing frequency. The method may comprise comparing more than one active and passive infrared images.

The method may comprise synchronizing the steps of radiating photons and acquiring infrared images. In this way, active infrared images are acquired when photons of the predetermined wavelength are radiated to the scene and passive infrared images are acquired captured when no photons of the predetermined wavelength are radiated to the scene. In this regard, it will be understood by those skilled in the art that aspects described above with respect of the first aspect of the invention apply mutatis mutandis to the second and third aspects of the invention described herein.

The method may comprises maintaining the detector at approximately 62K or 70K, and maintaining the optical filter at approximately 90K.

The method may comprise:

generating a live visible video image of the scene under observation;

processing generated output signals representative of at least one output infrared image; and overlaying processed at least one output infrared image corresponding to the processed output signals onto the generated live visible video image and/or an infrared image of the scene under observation thereby generating an infrared overlay video image of the scene under observation.

The step of processing the generated output signals representative of the at least one output image may comprise colour coding differences between compared active and passive frames, wherein the processed output infrared image is a colour coded image to be overlaid onto the generated live video image. Moreover, it will be noted that the step of processing the generated output signals representative of the at least one output image may comprise colour coding differences between compared active and passive frames, wherein the processed output infrared image is a colour coded image to be overlaid onto an infrared video image.

The method may comprise cleaning the generated infrared image by one or more of removing, replacing, and correcting pixels of the generated image which do not meet predetermined characteristics so as to generate a cleaned infrared image.

The method may comprise controlling an illuminator device selected from a group comprising an infrared illuminator, and a laser to radiate photons at, or around, a gas absorption wavelength of the particular predetermined gas selected for detection towards the scene under observation.

According to a third aspect of the invention, there is provided a non-transitory computer readable storage medium storing one or more computer executable instructions which when executed on one or more processors causes the one or more processors to perform the method described herein.

DETAILED DESCRIPTION OF THE DRAWINGS

Figure 1:
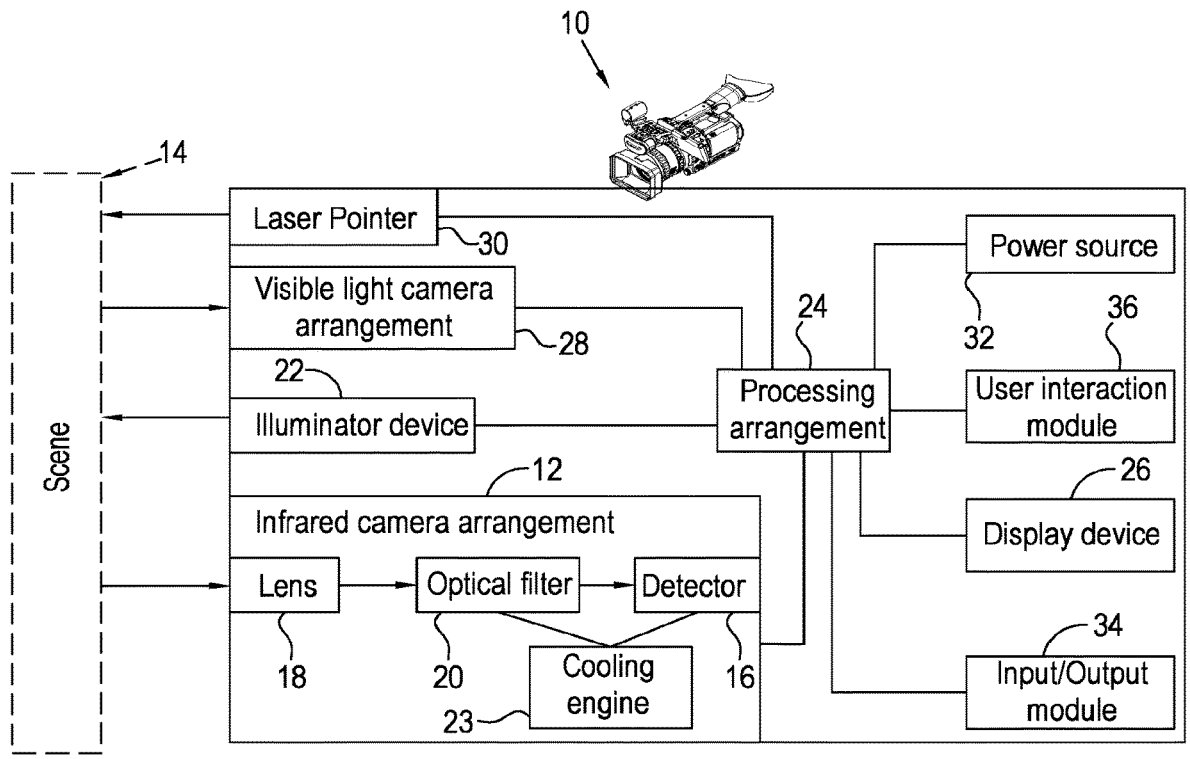
FIG. 1 shows a schematic diagram of a system in accordance with an example embodiment of the invention for facilitating detection of a predetermined gas.
Figure 2:
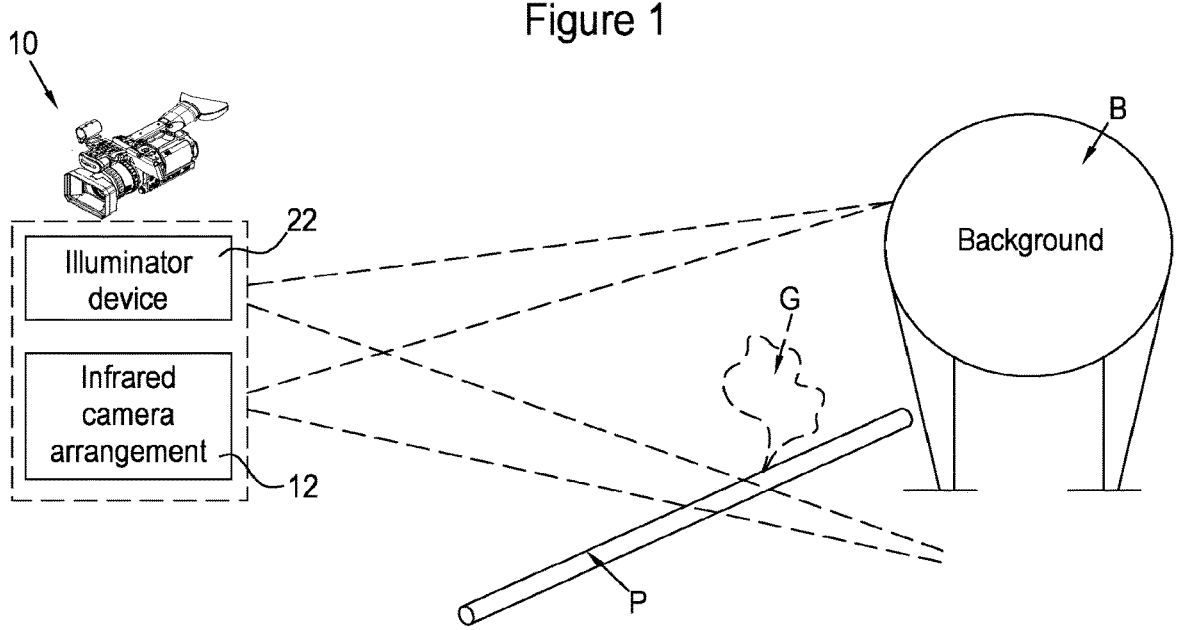
FIG. 2 shows an example illustration of portions of the system of FIG. 1, in use, in facilitating detection of a predetermined gas.

In the following description, for purposes of explanation, numerous specific details are set forth in order to provide a thorough understanding of an embodiment of the present disclosure. It will be evident, however, to one skilled in the art that the present disclosure may be practiced without these specific details.

Referring to FIGS. 1 to 4 of the drawings a system for facilitating the detection of a predetermined gas is generally indicated by reference numeral 10. In particular, the system 10 is for imaging a scene under observation with the camera and also imaging a predetermined gas having a predetermined absorption wavelength in the scene. In this way, looking at FIG. 2, a user of the system 10 may be able to detect that there is a gas leak G in the scene under observation, or not. In particular, hazardous gas leaks G may be detected in equipment, for example, pipes P associated with high voltage installations, prior to serious environmental and/or personal harm is caused thereby which is difficult to image or determined if in front of a background B, for example, an ambient background.

To this end, the system 10 may be a camera system 10 or alternately and interchangeably referred to as an imaging system 10 for imaging a gas of a particular pre-determined wavelength in a scene under observation. In a preferred example embodiment, the system 10 is enclosed in a handheld and/or mountable camera having a housing which houses the various components of the system 10 discussed below. Instead, the various components of the system 10 may be spread out, for example, geographically. In the case of the latter, the geographically spaced components of the system 10 may be communicatively coupled to each other, as the case may be, to achieve the functionality described herein. Notwithstanding, the system 10 will be described below as embodied in an apparatus comprising the various components of the system 10 enclosed in a housing.

Turning to FIG. 1, in particular, the system 10 comprises an infrared (IR) camera arrangement 12 configured to acquire infrared (IR) images of a scene under observation 14 at a predetermined frame rate. By "acquiring images", is also meant to include capturing/receiving images or acquiring electrical signals representative of IR images of a scene under observation. The frame rate of the arrangement 12 may be the frequency at which IR images or IR frames are acquired or captured by the arrangement 12.

In one example embodiment, the frame rate of the arrangement 12 is between 7.5 Hz and 30 Hz. In other example embodiments, the frame rate of the arrangement 12 is typically between 15 Hz and 60 Hz. The frame rate may be understood to mean the frequency at which the frames or images are acquired by the arrangement 12.

The IR camera arrangement 12 is an IR video camera arrangement 12 configured to acquire infrared video images. This may be on a frame by frame basis where each frame acquired is an image.

In one example embodiment, in order to acquire IR images of the scene 14, the arrangement 12 comprises a detector 16 comprising an array of quantum-well infrared photo detectors (not shown) configured to generate an electrical signal in response to a photon being received thereby. In one example embodiment, the detector 16 comprises a two dimensional array of quantum-well infrared photo detectors. The quantum-well infrared photo detectors have operative surfaces and are configured to generate electrical signals in the form of photocurrent in response to irradiance on the operative surface thereof. The quantum-well infrared photo detectors may have a quantum efficiency based on the particular selected gas for detection.

The quantum-well infrared photo detectors may comprise layers of Gallium Arsenide, and Aluminium Gallium Arsenide.

A lens 18 having a field of view is coupled to the detector 16 via a single narrow bandpass optical filter 20 centered around the absorption wavelength of the gas to be detected. The lens 18 is configured to collect photons from the scene under observation 14 and project the photons onto the detector 16 via the filter 20. The lens 18 may be constructed of Germanium, or a combination of Germanium and Silicon. It will be noted that the lens 18 is located on an outer surface of the housing which holds the system 10 in the case of the same being embodied in a single camera.

To this end, the detector 16, and lens 18 is selected based on a gas absorption wavelength of the gas to be detected. In particular, the detector 16, and lens 18, is matched to the gas absorption wavelength of the gas to be detected.

The arrangement 12 further comprises a cooling engine 23 configured to control the temperature of the detector 16, and the optical filter 20 to be at, or around, predetermined temperatures, respectively. For example, between a range of 60K and 75K, and/or 62K or 70K for the detector 16, and 85K and 95K, particularly 90K, for the filter 20. In some example embodiments, the filter 20 is integrated with the detector 16.

It will be understood that the IR camera arrangement 12 is configured to generate infrared images of the scene 14 based on electrical signals generated by the detector 16. In particular, the IR camera arrangement 12 is configured to convert photocurrent from the detector 16 to digital signals representative of infrared images of the scene under observation.

The system 10 preferably comprises illuminator device 22 configured to radiate photons at a predetermined wavelength to the scene under observation 16. The device 22 may radiate photons at a predetermined wavelength which may be matched to the gas to be detected.

The device 22 may have a suitable source which radiates photons. The device 22, or the source, may be in the form of an IR illuminator such as a suitable lamp, a heated electrical filament configured to radiate photons, a laser such as a quantum cascade laser configured to radiate photons, or the like. To this end, the phrases "radiate photons towards the scene 14", "illuminate the scene 14", or "output light towards the scene", etc. insofar as the illuminator device 12 is concerned all relate to the same principle of providing photons to the scene 12.

It will be noted that the housing which houses the system 10 is configured to house the illuminator device 22 in a fashion so that it directs or radiates photons to the scene 14, which scene falls in the field of view of the arrangement 12. The wavelength of the photons radiated by the illuminator device 22 corresponds, is particularly matched, to the absorption wavelength of the gas to be detected.

In some example embodiments, the device 22 is a separate device from the rest of the components of the system 10.

An important feature of the system 10 is that the illuminator device 22 is configured to be strobed at a frequency associated with the frame rate of the IR camera arrangement 12. The illuminator device 22 may be controllably strobed. By the terms "strobing" and "strobed", it is meant that the illuminator device 22 is switched between ON and OFF states, wherein it radiates photons to the scene 14 in the ON state and stops radiating photons to the scene 14 in the OFF state, in an alternate fashion. In some example embodiments, the period of the ON state and OFF state may be the same.

The device 22 may be strobed at a frequency associated with the frame rate at which the camera arrangement 12 acquires images/frame such that the camera arrangement 12 acquires images when the illuminator device 22 is switched to the ON state as well as when the illuminator device 22 is switched to the OFF state in a consecutive fashion. Differently stated, the camera arrangement 12 may have a frame rate at which it acquires images which corresponds to the frequency at which the illuminator device 22 is strobed such that the camera arrangement 12 acquires images when the illuminator device is switched to the ON state as well as when the illuminator device 22 is switched to the OFF state in a consecutive fashion.

The camera arrangement 12 and the device 22 may be calibrated so that the arrangement 12 captures consecutive frames when the device 22 is switched to either the ON or the OFF states in an alternating fashion. As can be best seen in FIG. 3, the illuminator device 22 is switched between ON and OFF states in a temporal fashion corresponding to the frame rate in which frames, or IR images, FRAMES 1 to 7 are captured/acquired. The FRAMES 1-7 are indicated for illustrative purposes as in use there will be multiple frames acquired in this fashion as will be well understood by those skilled in the field of invention. The FRAMES 1-7 captures alternate between passive frames/images P1-P4 captured by the camera arrangement 12 whilst the illuminator device 22 is in an OFF state or in other words not radiating photons towards the scene 14, and active frames/images A1-A3 captured by the arrangement 12 whilst the illuminator device 22 is an ON state or in other words radiating photons towards the scene 14. It may thus be provided that the system 10 may operate between active and passive modes.

It may therefore be said that the device 22 and arrangement 12 may be suitably calibrated so as to avoid scenarios where the consecutive frames acquired by the arrangement 12 are two consecutive active or passive frames. In other words, the device 22 and the arrangement 12 may be synchronized. In particular, the strobing frequency of the device 22 and the frame rate of the arrangement 12 may be synchronized with each other. It will be noted that either the arrangement 12 or the device 22 may be adapted so that active and passive images are consecutively captured in an alternate fashion.

Strobing of the illuminator device 22 as described herein effectively increases the signal (gas) to noise (background) ratio of the system 10 thereby increasing the sensitivity thereof. In this regard, a user of the system has a wider environment range in which to use the system 10, e.g., with sky as background, pipe as background, and the like. This is of course an obvious advantage over conventional active/passive detection schemes which do not necessarily have high signal to noise ratios which enable detection of gasses of interest with certain backgrounds.

Also, the strobing of the illuminator device 22 is relatively fast and thus the camera does not have time to move much between frames thereby eliminating the requirement for conventional active/passive systems having to keep the cameras very still to increase accuracy.

The illuminator device 22 comprises a source in the form of an IR illuminator such as heated electrical filament configured to radiate photons, and a laser such as a quantum cascade laser configured to radiate photons, or the like. To this end, the phrases "radiate photons towards the scene 14", "illuminate the scene 14", or "output light towards the scene", etc. insofar as the illuminator device 12 is concerned all relate to the same principle of providing photons to the scene 12.

In one example embodiment, where the ON state and OFF state of the illuminator device 22 is concerned a single operating cycle, the camera arrangement 12 may have a frame rate of approximately twice the strobing frequency of the illuminator device 22 so as to acquire two images in the single operating cycle (between ON and OFF states) of the device 22, viz., an active and passive image. In this regard, when the strobing frequency is between 5 Hz and 30 Hz, the frame rate of the camera arrangement 12 is approximately twice that of the strobing frequency and is therefore approximately between 10 Hz and 60 Hz so as to capture both active and passive images in a consecutive fashion. However, it will be noted that this need not be the case as the frame rate and strobing frequency may be synchronized in other ratios so as to ensure that the camera arrangement 12 acquires active and passive images consecutively in an alternating fashion as described herein, and illustrated in FIG. 3, at its respective frame rate.

In some example embodiments, the arrangement 12 may have a frame rate of four times that of the strobing frequency, for example, obtaining four images in the single operating cycle of the device 22, i.e., two active and two passive images.

Those skilled in the field of invention will understand that the device 22 may be strobed or controlled to strobe in a plurality of different ways. For example, the device 22 may be electronically controlled to strobe by switching the source/device 22 ON and OFF according to the predetermined strobing frequency. Instead, the system 10 may comprise a suitable mechanical/electromechanical shutter which is configured to block light radiating from the illuminator device 22/source or direct the illuminator device 22/source away from the scene 14 to achieve the desired strobing effect disclosed herein at the predetermined strobing frequency. As alluded to herein, the shutter may be electronically, mechanically, or electro-mechanically controlled.

In some example embodiments, the strobing may be achieved by directing the source toward and away from the scene 14. To this end, the device 22 may be configured to direct photons to the scene 14 by pointing the source of photons to the scene and away from the scene 14. To this end, the strobing of the illuminator device 22 may be understood to therefore mean radiating photons to the scene 14 and not radiating photons to the scene 14 in an alternate fashion, by whatever means as will be understood by those skilled in the field of invention.

The system 10 further comprises a processing arrangement 24. The processing arrangement 24 comprises one or more processors, for example, one or more central processing units, microcontrollers, microprocessors, field programmable gate arrays (FPGAs), application specific integrated circuits (ASICs), and the like and associated drivers, electronic components, etc. to achieve the functionality described herein. The arrangement 24 may comprise of one or more data storage devices/memory devices such as volatile memory and/or non-volatile memory such as flash memory, RAM (random access memory, ROM (read only memory), memory in the processors, or the like configured to store data including a set of computer executable instructions to control operation of the system 10. The arrangement 24 may control all the data and/or signal processing operations of the system 10. To this end, the arrangement 24 may comprise non-transitory computer-readable storage media which stored computer executable instructions which when executed by one or more processors, cause the same to control components of the system 10 and/or process data to provide outputs described herein.

To this end, though not illustrated, it will be appreciated to those skilled in the field that the system 10 may comprise various conventional components such as drivers, circuitry, and other electronic components to achieve the functionality described herein. Moreover, it will be noted that the various components of the system 10 may be communicatively coupled to either each other and/or to the arrangement 24 via suitable wiring as will be well understood.

Moreover, though described as independent components, it will be appreciated that various components in the system 10 may share resources and/or functionality with other components and/or may be spread out across the system 10 but described in a singular fashion where applicable as will be well understood by those skilled in the field of invention. For example, the processing arrangement 24 may be configured to control the strobing of the illuminator device 22 in a predetermined fashion.

In addition, the processing arrangement 24 may be configured to receive photocurrent from the detector 16, for example, via one or more internal or external analogue to digital components and process the same to generate digital signals representative of IR images at the predetermined frame rate. In the case of the latter, the arrangement 12 may be seen to form part of the arrangement 12. However, it will be understood that the arrangement 12 may alternately comprise one or more separate dedicated separate processors for generating images and/or signals representative thereof and transmit the same to the processor 24 for processing, though reference is made to the arrangement 24 for this purpose for ease of explanation.

In any event, the data storage device (not shown) of the arrangement 24 is typically configured to store at least one prior frame obtained via the IR camera arrangement 12, for example, FRAME 1 (passive frame P1) which is acquired by the camera arrangement 12 is stored in the data storage device as a prior frame in a temporal fashion (e.g., at time t−1). For ease of explanation and for clarity, it will be appreciated that the term "frame" may be understood to refer to an "image" captured by the arrangement 12.

The processor arrangement 24 is configured to compare at least one current frame obtained in a temporal fashion via the IR camera arrangement 12 (e.g. at time t) with the prior frame stored in the data storage device and generate an output signal in response to said comparison. For example, a current FRAME 2 may be compared with stored FRAME 1 or in other words, active frame or image A1 is compared with passive frame or image P1, and so on in a continuous fashion. Multiple frames may be stored and associated with a consecutive temporal sequence, in use. It will be appreciated that a current frame/image may be understood to mean a frame/image under consideration and prior frame/image may be understood to mean a frame/image which was acquired by the arrangement immediately before the current frame/image.

It will be noted that the processor arrangement 24 is configured to compare the current and prior frame by determining a difference between the compared images, wherein the output signal is representative of the said difference between the compared images. The processor arrangement 24 may apply conventional image processing techniques in this regard. The output signal may correspond to a processed output image which is representative of the difference between the compared current and prior infrared signals. In a preferred example embodiment, the output signal may correspond to a processed colour coded infrared image. Or other coloured image having pixels coloured based on the comparison. The coloured pixels in the processed output image may correspond to the flux absorbed by the gas to be detected.

To this end, it will be noted that the term "signal" as it refers to images herein, such as infrared images, may be understood to be electrical signals which correspond to and/or are representative of images as will be understood by those skilled in the field of invention. For example, the output signal generated by the processor arrangement 24 may be output infrared images and/or other processed images such as colour coded images as may be understood in the art. Differently stated, the output signals generated by the processor arrangement 24 may be representative of the output infrared image and/or other processed images.

It will be understood by those skilled in the art that the arrangement 24 may compare more than one active and passive images, for example, in the case wherein the arrangement 12 captures two active and two passive images in one cycle of the device 22, the arrangement may compare two current infrared images active/passive with two prior infrared images passive/active to generate the output signal.

In some example embodiments, the arrangement 12 may capture images (active and passive) of the scene during an inspection period or session wherein in the inspection period or session all active and passive frames are acquired and stored. The arrangement 24 is configured to compare current and prior frames in the temporal sequence in which they were acquired. This may be achieved in an off-line fashion/not completely in real-time or in real-time.

In other example embodiments, the arrangement 12 may capture images (active and passive) of the scene during an inspection period or session wherein in the inspection period or session a current frame is acquired and stored as a prior frame, and the arrangement 24 is configured to compare the next frame (which is considered the current frame) with the stored prior frame. The stored prior frame is then discarded, e.g., deleted from the data storage device, and the frame which was considered the prior frame is then stored as the prior frame. This may be done for the duration of the inspection period. This implementation may be achieved substantially in real-time.

By comparing the active and passive images, the output signal is indicative of the absorbed flux by the gas to be detected. The output signal may thus be represented in various ways as described herein. In this regard, insofar as the flux absorbed by the gas cloud in the active and passive images is concerned reference will be made to FIGS. 4 and 5 of the drawings.

Figure 4:
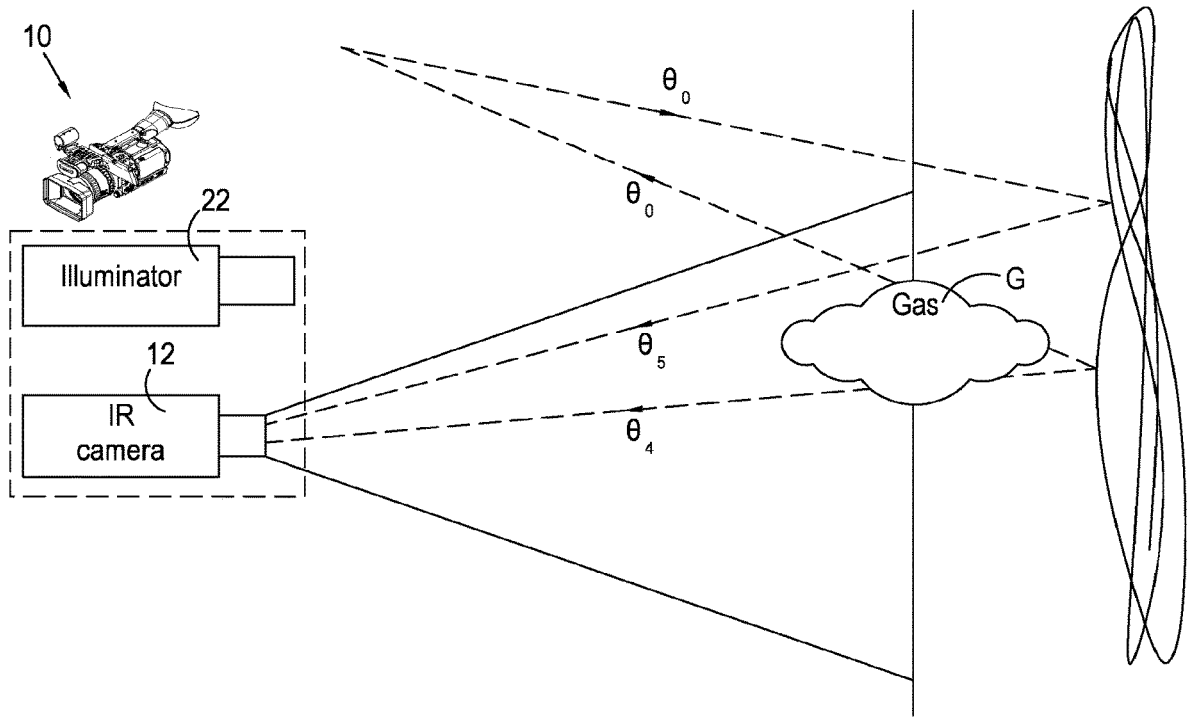
FIG. 4 shows portions of the system of FIG. 1, in use, in facilitating detection of a predetermined gas, particularly showing the photon flux received by the infrared camera arrangement.
Figure 5:
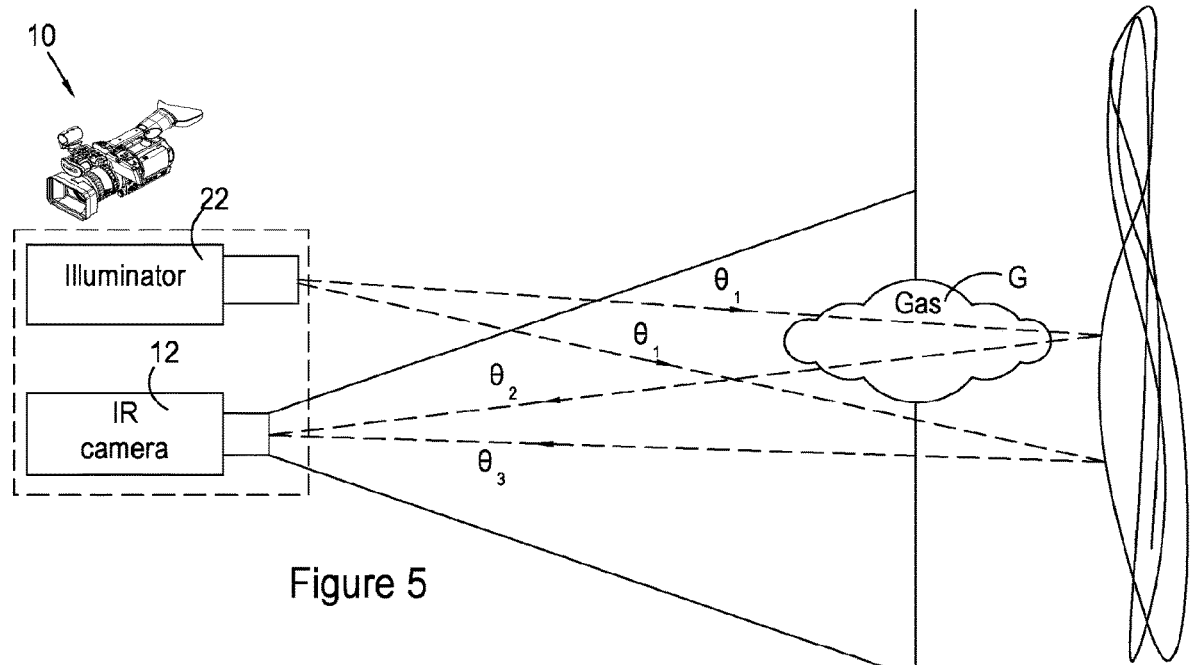
FIG. 5 shows another example illustration of portions of the system of FIG. 1, in use, in facilitating detection of a predetermined gas, also showing the photon flux emitted or radiated by the illuminator device and the photon flux received by the infrared camera arrangement.

In FIG. 4 an illustration is provided which indicates the operation of the system 10 for acquisition of a passive image, wherein:

$\theta_0$—ambient photon flux, determined by the environment.
$\theta_4$—reflected $\theta_0$ photon flux passing through the gas cloud, the gas cloud will absorb some of the flux.
$\theta_5$—reflected $\theta_0$ photon flux NOT passing through the gas cloud G.
If $\theta_0$ is reflected equally at each point;
$\theta_4$ will be equal to $\theta_5$ if there is no gas cloud G. If there is a gas cloud G $\theta_4$ will be less than $\theta_5$ because of the gas cloud G absorbing some of the reflected $\theta_0$.
Gas absorbed flux=$\theta_5-\theta_4$ In FIG. 5 an illustration is provided which indicates the operation of the system 10 for acquisition of an active image, wherein:

$\theta_1$—illuminator photon flux, determined by the illuminator.

$\theta_2$—reflected $\theta_1$ photon flux passing through the gas cloud G, the gas cloud G will absorb some of the flux.

$\theta_3$—reflected $\theta 1$ photon flux NOT passing through the gas cloud G.

If $\theta_1$ is reflected equally at each point;

$\theta_2$ will be equal to $\theta_3$ if there is no gas cloud. If there is a gas cloud $\theta_2$ will be less than $\theta_3$ because of the gas absorbing some of the reflected $\theta_1$.

Gas absorbed flux=$\theta_3-\theta_2$

It follows from the foregoing that in capturing a passive image, i.e., when the illuminator device 22 is OFF, the IR detector 16 will only receive $\theta_4$ and $\theta_5$. However, when capturing an active image when the illuminator device 22 is on, the IR detector 16 will receive ($\theta_4+\theta_2$) and ($\theta_5+\theta_3$).

In any event, returning to FIG. 1, the system 10 also comprises a display device 26 configured to display an output image based at least on the output signal generated by the processing arrangement 24 so as to facilitate detection of the particular predetermined gas, in use.

The display device 26 may be a conventional LED (Light Emitting Diode) display, an LCD (Liquid Crystal Display), an O-LED (Organic LED) display, or the like.

In one example embodiment, the system 10 comprises a visible light camera arrangement 28 configured to acquire visible light images of the scene under observation 14. It will be appreciated that the infrared camera arrangement 12 and the visible light camera arrangement 28 have substantially the same or similar field of view. The visible light camera arrangement 28 is typically a conventional visible light video camera arrangement configured to acquire visible light video images. In this regard, the processing arrangement 24 configured to combine the output signal generated thereby as described above in the aforementioned comparison with an output from the visible light camera arrangement to generate a combined signal representative of the flux absorbed as described herein superimposed onto a visible image of the scene under observation. This may be achieved via conventional image processing techniques well understood in the field of invention and in this way a user may easily observe a gas leak, if any, as an IR image superimposed on a visible light image.

The arrangement 24 may be configured to apply image processing techniques to address any errors in the operation of the system 10 between ON and OFF strobing states. These image processing techniques may be well known to those skilled in the field of image processing.

The processing described above is typically done in a streaming fashion, and substantially in real-time/near real-time, wherein output signals generated continuously in response to comparison between consecutive frames active and passive frames are continuously superimposed onto the visible images. It will be appreciated that the visible images generated by the arrangement 28 may be video images with a predetermined frame rate which may, for example, correspond to the frame rate of the IR camera arrangement 12.

The system 10 also include a few additional features such as a laser pointer 30 in the form of an LED (Light Emitting Diode) pointer configured to generate a beam of light which may be used in a selective fashion in orienting the camera to the scene 14.

The system 10 further comprises a power source 32 in the form of a re-chargeable portable battery locatable in the housing to power the system 10, as well as an I/O module 34 which allows data from the system 10 to be transferred from and to other computing devices, etc. The I/O module 34 may comprise suitable ports such as serial bus ports, jack ports, and the like.

Moreover, the system 10 may comprise a user interaction module 36 comprising one or more buttons, dials, touchscreens, voice recognition modules, and the like configured to receive user inputs and transmit the same to the processing arrangement 24 for controlling of the system 10 accordingly. The module 36 may be provided at an outer surface of the housing of the system 10 in a conventional fashion as a conventional camcorders and thus may comprise controls for standard features such as pan, and zoom, etc. The module 36 may in some example embodiments allow a user to be able to vary parameters of the system 10.

Figure 6:
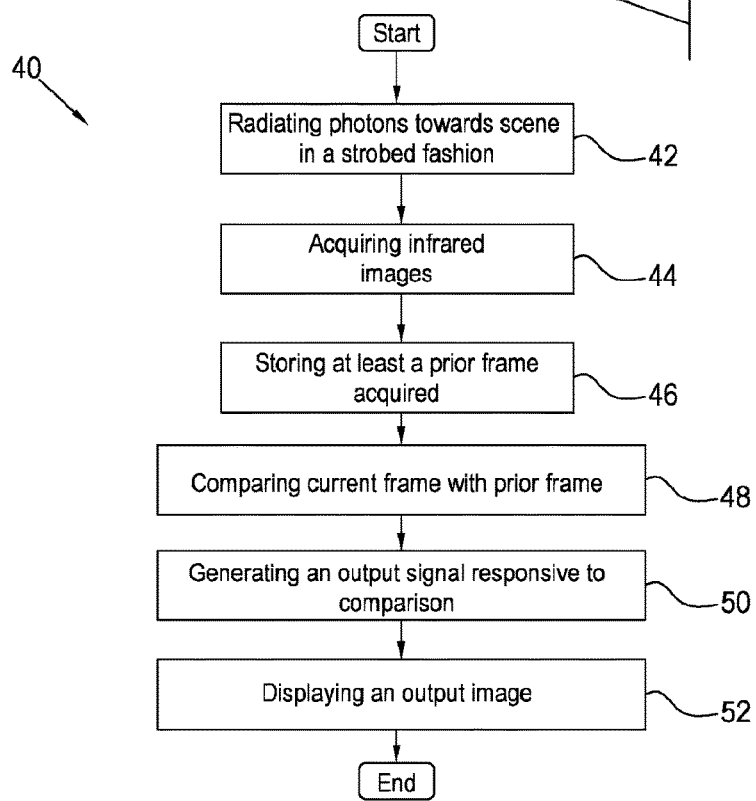
FIG. 6 shows a flow diagram of a method for facilitating the detection of gas in accordance with an example embodiment of the invention.

Turning now to FIG. 6 of the drawings where a block flow diagram of a method in accordance with an example embodiment of the invention is generally indicated by reference numeral 40. The method 40 is described with reference to the system 10 as described above for ease of understanding, but it will be appreciated by those skilled in the field of invention that the method 40 may be implemented by other systems, not illustrated, to achieve the functionality contemplated herein.

The method 40 is typically a method for facilitating the detection of a gas as described above, for example in an electrical installation. In this regard, the method 40 may comprise prior steps of selecting a system 10 matched to the gas to be detected and aiming the system 10 towards the equipment. As mentioned above, various components of the system 10 may be selected to be suitable for use in detecting a particular gas.

The method 40 may comprise prior steps of calibrating/synchronizing the camera arrangement 12 and the illuminator device 22 in a manner as described herein.

The method 40 then comprises radiating photons, at block 42, at a predetermined wavelength towards the scene under observation in a strobed fashion at a predetermined strobing frequency. This step may be done by controlling the device 22 as described above using a suitable shutter and/or other means.

Figure 3:
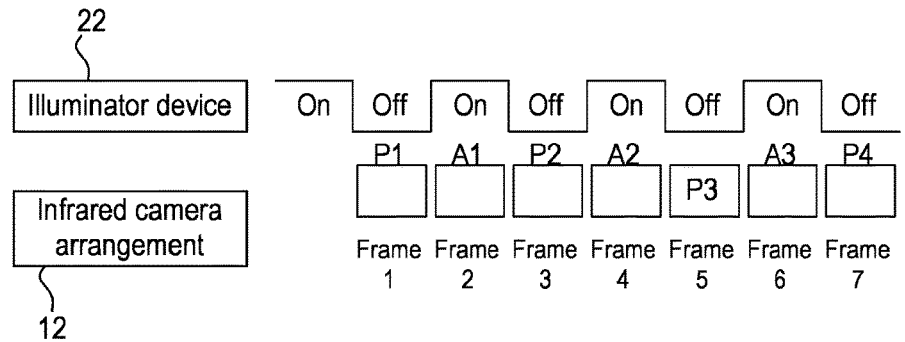
FIG. 3 shows an example illustration of the illumination and IR image acquisition or capture protocol employed in the system in accordance with an example embodiment of the invention

The method 40 comprises simultaneously as the step 42, acquiring infrared images, at block 44, from the scene under observation at a frame rate associated with the strobing frequency by way of the camera arrangement 12 as described above. In this way, active images are acquired during the ON state of the illuminator device 22, and passive images are acquired during the OFF state of the illuminator device 22 in an alternating consecutive fashion meaning that an active image is acquired after a passive image, and vice versa as illustrated in FIG. 3.

The method 40 then comprises storing, at block 46, at least a prior frame acquired from the scene 14 under observation in a data storage device or means. The method 40 then comprises comparing, at block 48, at least one current frame acquired with the stored at least one prior frame by way of the processing arrangement 24 as described above, so as to generate an output signal, at block 50, in response to said comparison. In other words, the method 40 comprises comparing active and passive infrared frames. These active and passive frames which are compared are captured and compared in a temporal fashion wherein a current active/passive infrared frame is compared with a previously captured prior passive/active infrared frame.

The step of comparing may be to determine the differences between the current and prior frames, and thus the amount of flux absorbed by the target gas as described above. This may be achieved by subtracting the current frame from the prior frame or vice versa, wherein the output signal is representative of the differences between the current frame and the prior frame and thus the amount of flux absorbed by the gas to be detected.

The method 40 then comprises displaying, at block 52, an output image on the display device 26 based at least on the generated output signal so as to facilitate detection of the particular predetermined gas. In particular, as alluded to above, the step 52 may comprise overlaying an IR image or other processed image such as a colour coded image representative of the generated output signal from step 50 onto an acquired visible video image so as to be able to interpret from the overlay that a gas is present in the scene under observation 14. The output signal may thus be a processed image having pixels corresponding to the flux absorbed by the gas to be detected coloured so as to facilitate the visualization of the gas leak, if any, in use.

The method 40 may be repeated until the inspection of a scene 14 is completed. In other words, the method 40 may be repeated until the inspection session is over.

It will be appreciated that the system 10 may comprise of a mass storage device to store pictures and videos of the scene 14. These pictures and videos can be displayed or played back or transferred to other devices to be displayed or played back later.

The system 10 may comprise of a device to send the output image to another device or system in real time (video streaming).

The system 10 may have a means of being remotely controlled, for example, by way a suitable controller and receiver associated with the system 10, wherein the receiver is configured to receive signals representative of control signals from the controller (for example, wirelessly from a remote controller) thereby to control operation of the system 10.

Figure 7:
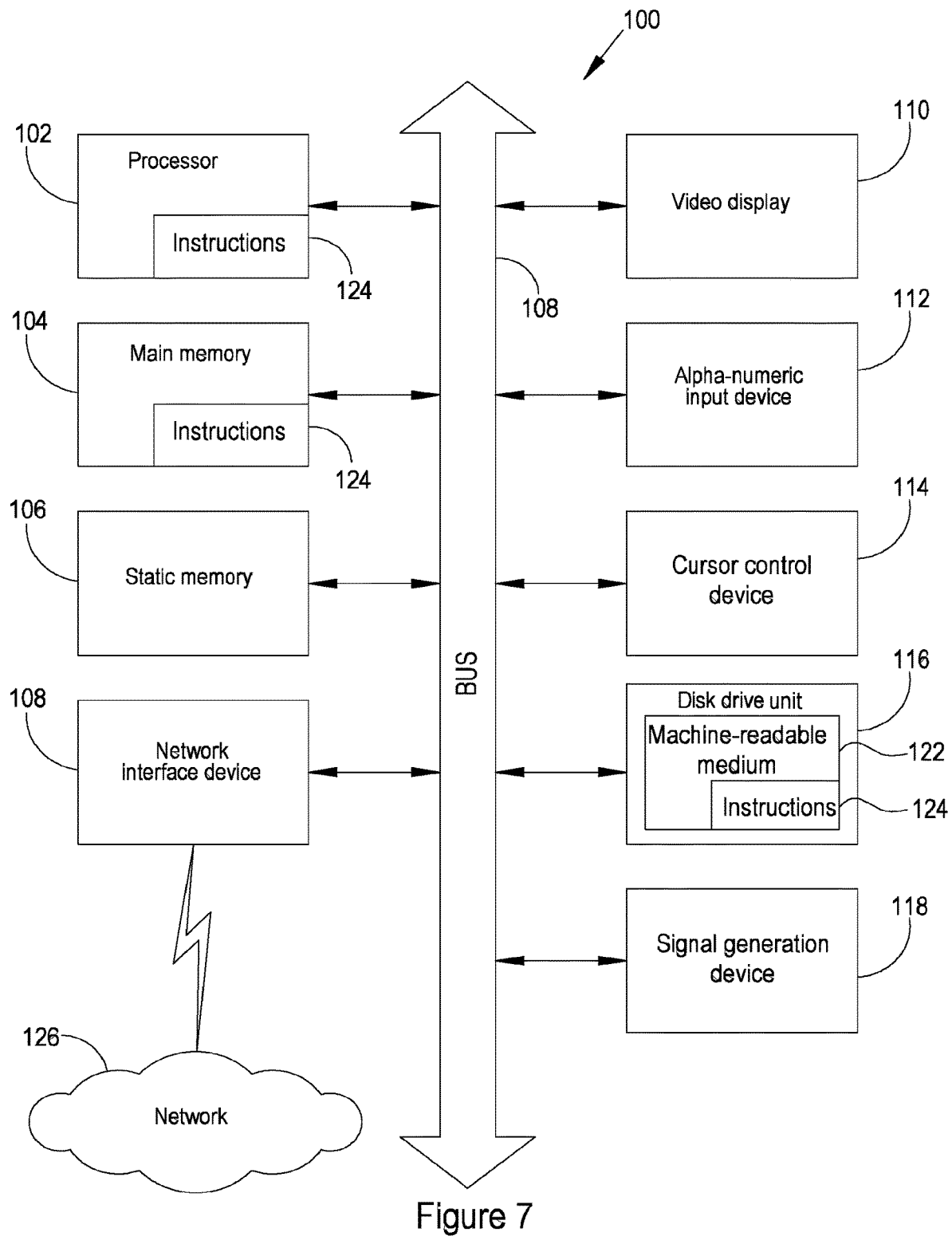
FIG. 7 shows a diagrammatic representation of a machine in the example form of a computer system in which a set of instructions for causing the machine to perform any one or more of the methodologies discussed herein, may be executed.

FIG. 7 shows a diagrammatic representation of machine in the example of a computer system 100 within which a set of instructions, for causing the machine to perform any one or more of the methodologies discussed herein, may be executed. In other example embodiments, the machine operates as a standalone device or may be connected (e.g., networked) to other machines. In a networked example embodiment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated for convenience, the term "machine" shall also be taken to include any collection of machines, including virtual machines, that individually or jointly execute a set (or multiple sets) of instructions to perform any one or more of the methodologies discussed herein.

In any event, the example computer system 100 includes a processor 102 (e.g., a central processing unit (CPU), a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a user interface (UI) navigation device 114 (e.g., a mouse, or touchpad), a disk drive unit 116, a signal generation device 118 (e.g., a speaker) and a network interface device 120.

The disk drive unit 16 includes a machine-readable medium 122 storing one or more sets of instructions and data structures (e.g., software 124) embodying or utilised by any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120 utilising any one of a number of well-known transfer protocols (e.g., HTTP).

Although the machine-readable medium 122 is shown in an example embodiment to be a single medium, the term "machine-readable medium" may refer to a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilised by or associated with such a set of instructions. The term "machine-readable medium" may accordingly be taken to include, but not be limited to, solid-state memories, optical and magnetic media, and carrier wave signals.

The invention claimed is:

1. A system for detecting a predetermined target gas in a scene under observation, wherein the system comprises:
    an infrared camera arrangement configured to acquire infrared images of the scene under observation at a predetermined frame rate;
    an illuminator device configured to radiate photons at a predetermined wavelength, at or around an absorption wavelength of the predetermined target gas selected for detection, to the scene under observation, wherein the illuminator device is strobed at a predetermined strobing frequency between an ON state in which photons at the predetermined wavelength are radiated to the scene under observation, and an OFF state in which photons of the predetermined wavelength are not radiated to the scene under observation, and wherein the strobing frequency of the illuminator device is associated with the predetermined frame rate of the infrared camera arrangement such that active infrared images are acquired by the infrared camera arrangement during the ON state of the illuminator device and passive infrared images are acquired by the infrared camera arrangement during the OFF state of the illuminator device in an alternating fashion at the predetermined frame rate;
    a processing arrangement, wherein the processing arrangement comprises:
        a data storage device configured to store at least one prior infrared image acquired by the infrared camera arrangement during a prior state of the illuminator device, wherein the prior infrared image is either an active infrared image or a passive infrared image; and
        at least one processor configured to compare at least one current infrared image, acquired by the infrared camera arrangement during a current state of the illuminator device that is different from the prior state, with the at least one prior infrared image stored in the data storage device and generate an output signal in response to said comparison, wherein the current infrared image is either a passive infrared image or an active infrared image, wherein the output signal is representative of an amount of illuminator photon flux absorbed by the predetermined target gas; and a display device configured to display an output image based at least on the output signal generated by the processing arrangement so as to facilitate detection of the predetermined target gas, in use.

2. The system as claimed in claim 1, wherein the processor is configured to compare the at least one current infrared image and the at least one prior infrared image by subtracting the at least one current infrared image from the at least one prior infrared image or by subtracting the at least one prior infrared image from the at least one current infrared image.

3. The system as claimed in claim 1, wherein the data storage device is configured to store the at least one current infrared image as the at least one prior infrared image and the infrared camera arrangement is configured to acquire a new at least one current infrared image during a next state of the illuminator device.

4. The system as claimed in claim 1, wherein the predetermined frame rate is associated with the predetermined strobing frequency in that the predetermined frame rate is an even multiple of the predetermined strobing frequency, and wherein the predetermined frame rate is at least four times that of the predetermined strobing frequency, and wherein the infrared camera arrangement acquires multiple active infrared images and multiple passive infrared images in each strobing cycle of the strobing frequency.

5. The system as claimed in claim 1, wherein the system comprises a shutter which is one of an electronic shutter, a mechanical shutter, and an electro-mechanical shutter configured to strobe the illuminator device.

6. The system as claimed in claim 1, wherein the output signal corresponds to a processed output image representative of at least one difference between the at least one current infrared image and the at least one prior infrared image, wherein the processed output image is indicative of an amount of flux absorbed by the predetermined target gas to be detected.

7. The system as claimed in claim 1, wherein the infrared camera arrangement comprises a single narrow bandwidth filter centered substantially at, or around, a gas absorption wavelength of the predetermined target gas selected for detection.

8. The system as claimed in claim 1, wherein the infrared camera arrangement is an infrared video camera arrangement configured to acquire infrared video images in a continuous fashion.

9. The system as claimed in claim 8, wherein the system comprises a visible light camera arrangement configured to acquire visible light images of the scene under observation, wherein the infrared camera arrangement and the visible light camera arrangement have substantially the same or similar field of view, and wherein the visible light camera arrangement is a visible light video camera arrangement configured to acquire visible light video images.

10. The system as claimed in claim 9, wherein the processing arrangement is configured to combine the output signal generated thereby with an output from the visible light camera arrangement to generate a combined signal representative of an infrared image of the scene under observation superimposed onto a visible image of the scene under observation, wherein the combined signal corresponds to the output image displayed by the display device.

11. The system as claimed in claim 1, wherein the predetermined wavelength at which the illuminator device radiates photons is based on the predetermined target gas to be detected.

12. The system as claimed in claim 1, wherein the illuminator device is selected from a group comprising an infrared illuminator, and a laser, wherein the infrared illuminator is in the form of a heated electrical filament arrangement, and wherein the laser is in the form of a quantum cascade laser.

13. The system as claimed in claim 1, wherein:
all or a majority of the system is located in a housing;
the housing defines a thermally insulated compartment for enclosing the infrared camera arrangement, the illuminator device, and the processing arrangement;
the system comprises a cooling arrangement to cool components of the system in the housing; and
the housing comprises an eyepiece aligned with the display device so that a user is able to view the display device within the housing via the eyepiece.

14. The system as claimed in claim 1, wherein the system comprises a laser pointer to assist a user to orient the system to the scene under observation.

15. A method of detecting a predetermined target gas, wherein the method comprises:
radiating, by an illuminator device, photons at a predetermined wavelength, at or around an absorption wavelength of the predetermined target gas selected for detection, towards a scene under observation in a strobed fashion at a predetermined strobing frequency such that photons at the predetermined wavelength are radiated to the scene under observation, and photons at the predetermined wavelength are not radiated to the scene under observation in an alternating fashion according to the predetermined strobing frequency;
acquiring, by an infrared camera arrangement, infrared images from the scene under observation at a predetermined frame rate, wherein the predetermined frame rate is associated with the predetermined strobing frequency such that active infrared images are acquired while photons at the predetermined wavelength are radiated to the scene under observation, and passive infrared images are acquired while photons at the predetermined wavelength are not radiated to the scene under observation in an alternating fashion at the predetermined frame rate;
storing, by a data storage device of a processor arrangement, at least one prior infrared image acquired from the scene under observation during a prior state of the illuminator device, wherein the at least one prior infrared image is either an active infrared image or a passive infrared image,
comparing, by at least one processor of the processor arrangement, at least one current infrared image, acquired during a current state of the illuminator device that is different from the prior state, with the stored at least one prior infrared image, wherein the at least one current infrared image is either a passive infrared image or an active infrared image;
generating, by the at least one processor of the processor arrangement, an output signal in response to said comparison, wherein the output signal is representative of an amount of illuminator photon flux absorbed by the predetermined target gas; and displaying, by a display device of the processor arrangement, an output image on a display device based at least on the generated output signal so as to facilitate detection of the predetermined target gas.

16. The method as claimed in claim 15, wherein the predetermined frame rate is associated with the predetermined strobing frequency in that the predetermined frame rate is an even multiple of the predetermined strobing frequency, wherein the predetermined frame rate is at least four times the predetermined strobing frequency, and wherein the infrared camera arrangement acquires multiple active infrared images and multiple passive infrared images in each strobing cycle of the strobing frequency.

17. The method as claimed in claim 15, wherein the method comprises:
   acquiring visible light images of the scene under observation;
   combining the generated output signal with a signal representative of an acquired visible light image to generate a combined signal representative of an image of the scene under observation superimposed onto a visible image of the scene under observation; and
   displaying the combined signal on the display device.

18. The method as claimed in any claim 15, wherein the method comprises:
   collecting photons from the scene under observation with a lens having a field of view;
   projecting, with the lens, photons collected to a detector;
   filtering photons projected from the lens with an optical filter thereby to allow only projected photons at the predetermined wavelength to pass through to the detector;
   generating electrical signals in response to filtered photons of the predetermined wavelength being received by the detector; and
   generating an infrared image of the scene under observation based on the electrical signals received from the detector, wherein the generated infrared image is the acquired infrared image.

19. The method as claimed in claim 18, wherein the method comprises cooling the detector to, and maintaining the detector at, a temperature between a range of approximately 60K and 75K; or wherein the method comprises cooling the optical filter to, and maintaining the optical filter at, a temperature between a range of approximately 85K and 95K.

20. One or more non-transitory computer-readable storage media storing instructions that, when executed by one or more processors, cause:
   radiating, by an illuminator device, photons at a predetermined wavelength, at or around an absorption wavelength of a predetermined target gas selected for detection, towards a scene under observation in a strobed fashion at a predetermined strobing frequency such that photons at the predetermined wavelength are radiated to the scene under observation, and photons at the predetermined wavelength are not radiated to the scene under observation in an alternating fashion according to the predetermined strobing frequency;
   acquiring, by an infrared camera arrangement, infrared images from the scene under observation at a predetermined frame rate, wherein the predetermined frame rate is associated with the predetermined strobing frequency such that active infrared images are acquired while photons at the predetermined wavelength are radiated to the scene under observation, and passive infrared images are acquired while photons at the predetermined wavelength are not radiated to the scene under observation in an alternating fashion at the predetermined frame rate;
   storing, by a data storage device of a processor arrangement, at least one prior infrared image acquired from the scene under observation during a prior state of the illuminator device, wherein the at least one prior infrared image is either an active infrared image or a passive infrared image,
   comparing, by at least one processor of the processor arrangement, at least one current infrared image, acquired during a current state of the illuminator device that is different from the prior state, with the stored at least one prior infrared image, wherein the at least one current infrared image is either a passive infrared image or an active infrared image;
   generating, by the at least one processor of the processor arrangement, an output signal in response to said comparison, wherein the output signal is representative of an amount of illuminator photon flux absorbed by the predetermined target gas; and
   displaying, by a display device of the processor arrangement, an output image on a display device based at least on the generated output signal so as to facilitate detection of the predetermined target gas.

* * * * *